United States Patent Office 3,548,017
Patented Dec. 15, 1970

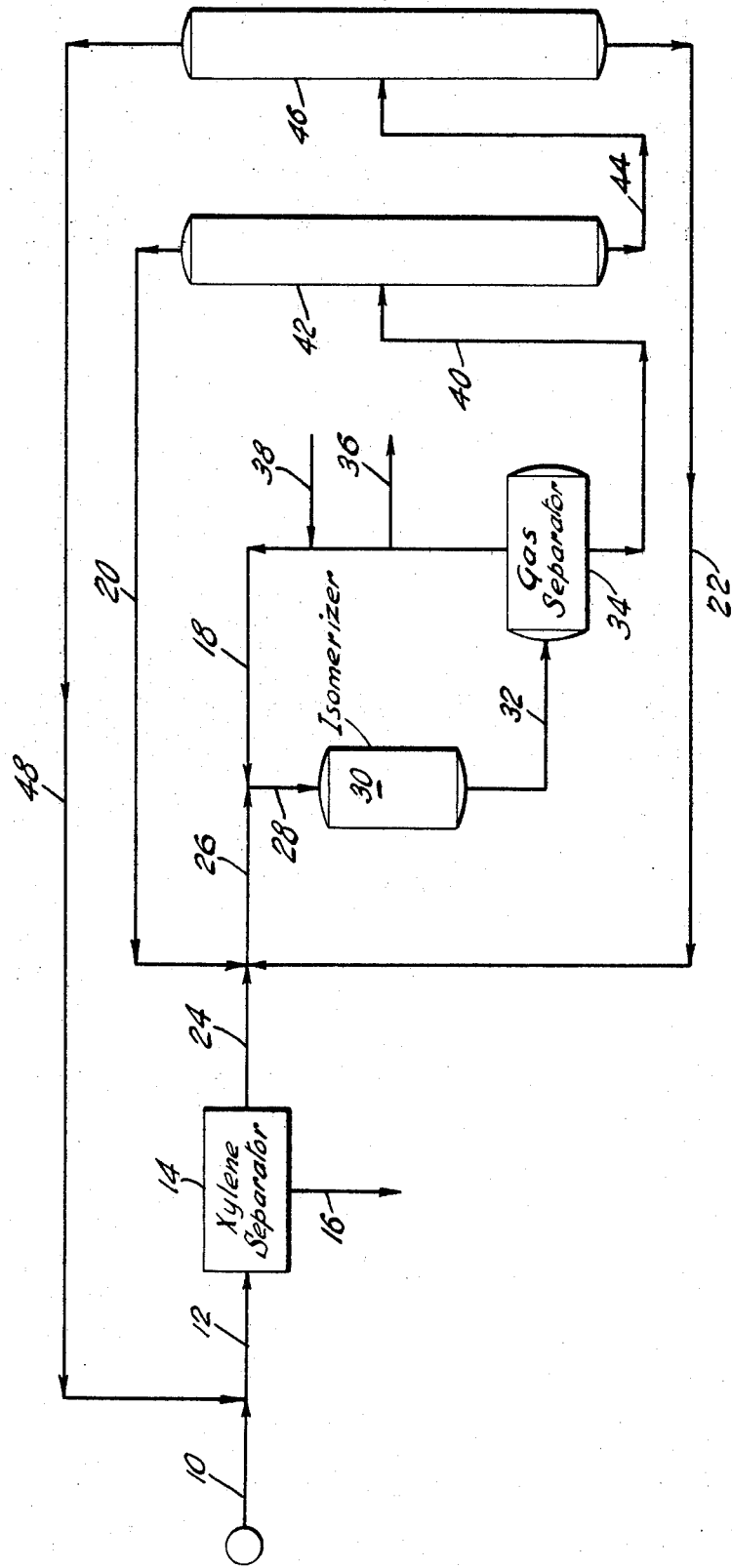

3,548,017
XYLENE ISOMERIZATION PROCESS
Gayle P. Hebert, Port Neches, and Jerry C. Perciful and Ambrose J. Startz, Groves, Tex., and Halsey E. Griswold, Hopewell Junction, N.Y., assignors to Texaco Inc., New York, N.Y., a corporation of Delaware
Filed Sept. 25, 1968, Ser. No. 762,450
Int. Cl. C07c 15/08
U.S. Cl. 260—668
10 Claims

ABSTRACT OF THE DISCLOSURE

A process for the production of a dimethylated $C_8$ aromatic hydrocarbon, and in a particularly preferred embodiment paraxylene, by the steps of initially separating a selected xylene isomer from an aromatic hydrocarbon stream containing orthoxylene, metaxylene, paraxylene and ethylbenzene thereby providing a residuum aromatic hydrocarbon stream and recovering the separated xylene isomer, isomerizing the residuum under hydroisomerization conditions thereby producing an isomerizate enriched with the separated zylene isomer, separating the isomerizate into a lighter than $C_8$ fraction, a $C_8$ fraction and a heavier than $C_8$ fraction, recycling the lighter than $C_8$ fraction and the heavier than $C_8$ fraction and introducing the recycle fractions along with the residuum to the isomerization step, and recycling the $C_8$ fraction to the separation step.

---

This invention relates to a method for isomerizing alkylated aromatic hydrocarbons. In particular, this invention is directed to the production and recovery of xylene isomers from streams containing $C_8$ aromatic hydrocarbons.

Heretofore, aromattic hydrocarbons containing the isomers ortho-, meta- and paraxylene along with ethylbenzene were extensively used as octane builders in gasoline. More recently, interest has arisen in the methylated isomers as valuable raw materials in, for example, the production of benzene carboxylic acids. With regard to paraxylene, its importance as a chemical building block has prompted widespread demand such that existing sources are straining to maintain adequate supply. The greater demand for paraxylene has arisen by virtue of its being a precursor for polyester fibers and resins through the intermediates terephthalic acid and dimethyl terephthalate. In view of this increasing demand various processes have been proposed whereby paraxylene is prepared by isomerizing under catalytic conditions $C_8$ aromatic streams. Notwithstanding the advances made in the catalytic isomerization of $C_8$ aromatic streams to provide increased production of the desired para isomer, the demand continues to exist for more efficient processes for the production thereof wherein alkyl aromatic feed streams can be substantially converted to paraxylene with minimal by-product formation.

While increasing the availability of paraxylene is, of course, of prime consideration a further demand exists for a flexible process that is, one capable of providing any one of the selected xylene isomers in response to market demands. As we have mentioned above the presently expanding requirements of paraxylene for polyester fibers are causing strain on existing facilities. Similarly, ortho- and metaxylenes are also valuable precursors for acid anhydrides and dicarboxylic acids which may be converted to diester-type plasticizers and lubricants. As such, a valuable isomerizaztion process would be one permitting the xylene isomerizer to provide and recover any one of the three xylene isomers depending upon the prevailing market conditions. Moreover, the xylene isomer should be provided in high purities of, for example, at least 95 weight percent.

It is therefore, an object of this invention to provide a process for the upgrading of hydrocarbon fractions.

Another object of this invention is to provide a process for the production and recovery of orth-, meta- or paraxylene by isomerizing $C_8$ aromatic hydrocarbon streams.

Yet another object of this invention is to provide a process for the production and recovery of paraxylene by isomerizing a mixture of $C_8$ aromatic streams.

Still another object of this invention is to provide a continuous process for isomerizing $C_8$ aromatics such that the selected xylene isomer is recovered in high yield with minimal loss through undesired by-product formation.

Other objects and advantages will become apparent from a reading of the following descriptions and examples.

Broadly, this invention contemplates a process for the production of dimethylated $C_8$ aromatic hydrocarbon which comprises the steps of:

(a) Separating a xylene isomer from an aromatic hydrocarbon stream containing orthoxylene, metaxylene, paraxylene, and ethylbenzene thereby providing a residuum aromatic hydrocarbon stream and recovering said separated xylene isomer;

(b) Isomerizing the residuum under hydroisomerization conditions thereby producing an isomerizate enriched with the separated xylene isomer;

(c) Separating the isomerizate into a lighter than $C_8$ fraction, a $C_8$ fraction and a heavier than $C_8$ fraction;

(d) Recycling the lighter than $C_8$ fraction and the heavier than $C_8$ fraction of step (c) and introducing these fractions along with the residuum of step (a) into step (b); and (e) Recycling the $C_8$ fraction of step (c) to step (a).

In one embodiment of this invention, there is contemplated a continuous and cyclic process for the production of paraxylene the steps of which comprise separating paraxylene from a mixture composed of the aromatic hydrocarbons para-, meta-, and orthoxylene and ethylbenzene, subjecting the residuum from the aromatic hydrocarbon separation to isomerization under hydroisomerization conditions to produce a paraxylene enriched isomerizate, subsequently separating the isomerizate into a $C_8$ fraction, a lighter than $C_8$ fraction and a heavier than $C_8$ fraction and introducing the lighter and heavier than $C_8$ fractions to the lean paraxylene residuum prior to introduction into the isomerization zone and admixing the $C_8$ fraction with the fresh feed $C_8$ alkyl aromatics prior to xylene separation and repeating the sequential operation. When other than the paraxylene isomer is selected for recovery, we alternatively provide for the separation of ortho- or metaxylene from the initial mixed aromatic stream with the remaining sequential operational steps performed in an identical manner.

In a highly preferred embodiment, the present invention contemplates a continuous process for the preparation and separation of paraxylene, the steps which comprise introducing a fresh feed of equilibrium $C_8$ aromatics from, for example, the $C_8$ aromatic fraction from a reforming and aromatic solvent extraction and fractionation operation and combining therewith recycle xylenes separated from the isomerization reactor effluent and feeding this mixed stream to a separation process as by crystallization where paraxylene is recovered from a crystallizer. The residuum from the separation along with recycle lighter than $C_8$ and heavier than $C_8$ fractions are fed to an isomerization zone along with hydrogen and the isomerization reactor effluent passes to a gas separator which removes the gases and light hydrocarbons (hydrogen and $C_1$–$C_6$ paraffinic hydrocarbons) which are recycled to the isomerization reactor. Thereafter, the gas separated liquid flows to a two-fractionator system for separation and recycle. The first fractionator overhead comprises non-aromatics, benzene and toluene which is maintained at an overhead temperature of from 121 to 205° C. and a pressure of from 5 to 100 p.s.i.g. The bottoms from the first fractionator then flow to a second fractionator maintained at an overhead temperature of from 155 to 242° C. and a pressure of from 5 to 100 p.s.i.g. such that the bottoms of the second fractionator are composed of $C_9$ and $C_{10}$ polymethylbenzenes. The overhead of fractionator number 1 and the bottoms of fractionator number 2 are each recycled to the isomerization reactor. The second fractionator overhead containing equilibrium $C_8$ aromatics is recycled and combined with fresh feed for introduction into the paraxylene separator, the operational steps being continuous and cyclic.

The particular method whereby the single xylene isomer i.e., ortho-, meta-, or paraxylene is separated from the mixture of $C_8$ isomers may be undertaken by the various methods known to the art and the residual xylene fraction after separation of the desired xylene isomer may be recovered as a raffinate, mother liquor, a distillation fraction, filtrate, complex, clathrate, adduct, adsorbate or a molecular compound. However, it is preferred in the case of paraxylene recovery that the xylene feed be passed into a fractional crystallization zone wherein portions of the paraxylene isomer are crystallized at low temperature. The crystallized mixture is next introduced into a centrifuge from which crystallized paraxylene is removed as a cake and the mother liquor or residuum is removed as the filtrate. Alternatively, and in place of centrifuging the crystallized paraxylene may be separated by filtration, decantation or other suitable solid-liquid separation equipment to separate a cake of susbtantially pure paraxylene. It is to be understood, that the inventive concept herein defined contemplates all known methods for the separation and recovery of xylenes from the mixtures containing the same.

The residual $C_8$ fraction containing, for illustrative purposes, unseparated paraxylene, along with orthoxylene, metaxylene and ethylbenzene is recovered as mentioned above as a raffinate, a mother liquor, a distillation fraction or other fraction depending upon the particular method of separation employed. The residuum, along with recycled non-aromatics such as methylcyclopentane, cyclohexane, methylcyclohexane, dimethylcyclohexanes and benzene, toluene, and heavier than $C_8$ aromatics such as trimethylbenzenes and tetramethylbenzenes are mixed with hydrogen to provide an isomerization feed to the isomerization reaction zone.

The mixed isomerization feed as composed above is introduced into the isomerization zone where it is contacted with an isomerization catalyst under hydroisomerization conditions. The appropriate isomerization catalysts broadly include the metals, oxides and sulfides of the metals of Groups VI-B and VIII of the Periodic Chart. Such materials may be employed as supported catalysts where the support consists of such materials as alumina, silica-alumina, zinc oxide, magnesia, crystalline zeolites, magnesium oxide, calcium oxide, titanium oxide, silica gel, fuller's earth, kaolin, kieselguhr, diatomaceous earth, bauxite, and other naturally occurring adsorbent clays. Among the appropriate metals we mention chromium, tungsten, molybdenum, nickel, platinum and palladium along with mixtures thereof. Particularly preferred catalysts are platinum on alumina or silica-alumina and combinations of nickel and tungsten as the metal, oxide or sulfide on a support of silica-alumina or synthetic molecular sieve or on a mixed support composed of synthetic molecular sieve dispersed in a semi-synthetic commercial silica-alumina cracking catalyst matrix. A highly preferred catalyst is composed of a mixture of nickel and tungsten as the metal, oxide or sulfide impregnated on a zeolite Y molecular sieve cracking catalyst. The preferred catalyst is composed of approximately 6 weight percent nickel and 19 weight percent tungsten calculated as weight perecnt metal on a support composed of approximately 20 weight percent zeolite Y dispersed in a semi-synthetic conventional silica-alumina cracking catalyst matrix. The catalyst mentioned above and employed in the instant process can easily be regenerated by employing conventional procedures to remove carbon deposited thereon as by, for example, exposing the catalyst to an oxygen containing gas at temperatures of from 850° F. to 1050° F. for a period of time of from 12 to 200 hours sufficient to burn carbon off of the catalyst.

The conditions employed in the isomerization zone generally entail carrying out the reaction at temperature of from 600 and 1000° F. under pressures of from 50 to 500 pounds per square inch with space velocities ranging from 1 to 10 volumes of liquid isomerization feed per volume of catalyst per hour and a hydrogen to hydrocarbon mole ratio ranging from 1:1 and 20:1. Preferably the process is carried out at temperatures of from 650 and 950° F. under pressures of from 100 to 300 pounds per square inch at space velocities of from 1 to 4 volumes of liquid hydrocarbon charge per volume of catalyst per hour and a hydrogen to hydrocarbon mole ratio of from 3:1 to 15:1. The hydrogen employed in the isomerization reaction zone may be pure hydrogen but we prefer to employ hydrogen such as that originating from a catalytic reforming unit (CRU) containing from 40 to 95 volume percent hydrogen the remainder being predominantly $C_1$–$C_6$ paraffinic hydrocarbons. In a highly preferred embodiment, the make-up and/or recycle hydrogen gas is introduced into the isomerization reaction zone lean of $C_1$ to $C_6$ paraffin hydrocarbons such that the hydrogen stream comprises at least 85 volume percent hydrogen. Illustratively, removal of the hydrocarbons from the hydrogen stream may be accomplished by passing the fresh CRU make-up gas and/or recycle-gas through an oil absorber tower. Alternatively or in addition thereto, the make-up gas is introduced into the isomerization reactor effluent or isomerizate where the heavier paraffinic hydrocarbons are dissolved in the separator liquid phase and subsequently removed from the liquid stream by, for example, fractionation. By reducing the lower hydrocarbon content of hydrogen streams to below 15 volume percent there is provided a substantial reduction in carbon deposition on catalyst surfaces which in turn contributes to increased reactor on stream times through the lengthing of time intervals between catalyst regenerations.

When operating the isomerization reaction zone in accordance with the procedures described above, the catalyst basically tends to re-establish an equilibrium mixture of a $C_8$ aromatic such that there will be a formation of whichever isomer is present in the isomerization feed stock in less than the equilibrium concentration. For example, where the feed is lean in paraxylene as it emerges from the xylene separation unit, isomerization under conditions described above will favor formation of paraxylene. Similarly, where ortho- or meta-lean isomerization feed stocks are introduced into the isomerization zone, they likewise will be produced by a re-establishment of an equilibrium mixture as the isomerizate emerges from the isomerization zone.

The isomerization reactor effluent thereafter flows to suitable separation equipment where hydrogen and $C_1$–$C_6$ paraffins are initially removed as gases from the stream. These gases are recycled to the isomerization reactor and the hydrogen purity of the total feed gas is maintained at the desired level by purging a portion of the recycled gas from the unit and adding fresh hydrogen as make-up as described above. The gas separator liquid next flows to a two fractionator system for product separation. As mentioned earlier, the first fractionator overhead containing non-aromatics, benzene and toluene, preferably benzene and toluene, and the second factionator bottoms containing $C_9$ and $C_{10}$ polymethylbenzenes are recycled to the isomerization reactor. The second fractionator overhead containing equilibrium $C_8$ aromatics is recycled to the xylene separator.

By employing the procedure for recycling non-aromatics, benzene, toluene and polymethylbenzenes to the isomerization reactor we provide a more economical operation than heretofore available. Inasmuch as these materials are by-products formed principally by xylene disproportionation and other equilibrium reactions, we have found that by including these by-products along with the separated residuum as part of the isomerization feed, the entire feed is thereby stabilized and further xylene or $C_8$ aromatic hydrocarbon disproportionation reactions are greatly suppressed. In a preferred embodiment, non-aomatic by-products may be separated by fractionation along with the $C_1$ to $C_6$ paraffinic hydrocarbons contained in the make-up or recycle hydrogen streams. By removing the non-aromatic by-products by fractionation from the lighter than $C_8$ stream, further reduction of carbon deposition upon the catalyst can be realized. Consequently, when operating in accordance with this invention, a high process selectivity for the production of paraxylene, orthoxylene, or metaxylene, and particularly paraxylene, is provided, which along with recycle presents a 70 to 100 percent xylene equilibrium approach and further provides approximately 98 weight percent total $C_8$ aromatic recovery. In combination therefore, by recycling benzene, toluene, heavier than $C_8$ and non-aromatics such as methylcyclopentane, cyclohexane, methylcyclohexane and dimethylcyclohexane disproportionation reactions are greatly suppressed and the initial feed is substantially recycled to extinction.

The attached drawing illustrates the present invention where a $C_8$ aromatic hydrocarbon stream such as is obtained from a $C_8$ aromatic fraction from a reforming and aromatic solvent extraction and fractionation unit and containing, for example, 21.4 weight percent orthoxylene, 48.7 weight percent metaxylene, 21.4 weight percent paraxylene, and 8.5 weight percent ethylbenzene is introduced through line 10 together with a recycle isomerizate stream composed of predominantly $C_8$ aromatics through line 48 and the combined streams are introduced into xylene separator 14 through line 12. Xylene, for example, paraxylene, is removed from the separator 14 through line 16 and the residuum of the aromatic hydrocarbon stream is fed to isomerizer 30 through lines 24, 26, and 28. Recycle lighter than a $C_8$ fraction composed of non-aromatics, benzene and toluene from line 20 and trimethylbenzenes and tetramethylbenzenes from line 22 are fed to isomerizer 30 through lines 26 and 28. Hydrogen from lines 38 and 18 is introduced into isomerizer 30 through line 28. The crude isomerizate effluent emerges from isomerizer 30 and flows to liquid gas separator 34 through line 32. Hydrogen and $C_1$–$C_6$ paraffins are separated through line 18. The off-gas in line 18 may be bled through line 36 with make-up hydrogen being introduced into line 18 through line 38. The gas separator liquid from separator 34 is fed to a first fractionator 42 through line 40 where lighter than $C_8$ constituents such as methylcyclopentane, cyclohexane, methylcyclohexane and dimethylcyclohexanes along with benzene and toluene are removed as overhead and returned to the isomerization reactor 30 through lines 20, 26 and 28. The bottoms of the first fractionator 42 are fed to a second fractionator 46 line 44 where the heavy ends of the isomerization effluent composed of tri- and tetramethylbenzenes are removed as bottoms through line 22 and returned to isomerization reactor 30 through lines 22, 26 and 28. The overhead from the second fractionator 46 composed of $C_8$ aromatics including ethylbenzene, paraxylene, metaxylene and orthoxylene are returned to the xylene separator 14 through lines 48 and 12.

In order to more fully illustrate the nature of this invention the following examples are presented.

EXAMPLE I

A fresh feed, 14.8 parts, having a composition of 8.5 percent ethylbenzene, 21.4 percent paraxylene, 48.8 percent metaxylene and 21.4 percent orthoxylene is combined with 79.76 parts of $C_8$ recycle isomerizate fraction having a composition of approximately 6.0 percent ethylbenzene, 22.1 percent paraxylene, 45.8 percent metaxylene and 26.1 percent orthoxylene and the resulting mixture is fed to a paraxylene separation zone wherein paraxylene crystals are formed by cooling to approximately $-63°$ C. and are separated by centrifugation. Approximately 12.63 parts of paraxylene crystals are recovered.

The residuum or mother liquor from the separator is combined with 43.89 parts of a recycle lighter than $C_8$ fraction composed of 7.8 percent non-aromatics, 16.4 percent benzene and 75.8 percent toluene and 53.51 parts of a heavier than $C_8$ recycle fraction composed of 75.3 percent trimethylbenzenes, 24.0 percent tetramethylbenzenes and 0.7 percent heavier aromatics and is further combined with 74.48 parts of a gas feed composed of 43.2 percent hydrogen and 56.8 percent of $C_1$ to $C_6$ paraffins. The combined isomerization feed is thereafter introduced into the hydroisomerization zone containing a nickel tungsten isomerization catalyst and exposed to isomerization conditions of 750° F. at a pressure of 200 p.s.i.g. at a liquid hourly space velocity of 3.0 and under a hydrogen partial pressure 196 p.s.i.a. where the paraxylene depleted mixture is isomerized and a crude isomerizate containing a paraxylene enriched effluent is obtained. The crude effluent is passed through a liquid gas separator wherein hydrogen and $C_{1-6}$ gases are removed and recycled. The separated liquid, 177.16 parts, composed of 1.9 percent non-aromatics, 4.1 percent benzene, 18.8 percent toluene, 2.7 percent ethylbenzene, 10.0 percent paraxylene, 20.6 percent metaxylene, 11.8 percent orthoxylene, 22.7 percent trimethylbenzenes, 7.2 percent tetramethylbenzenes and 0.2 percent heavy aromatics is introduced into a first fractionator where 43.89 parts of a lighter than $C_8$ fraction is removed as an overhead at a temperature of 121° C. and a pressure of 5 p.s.i.g. and the bottoms are fed to a second fractionator wherein 79.76 parts of a $C_8$ fraction are removed overhead at a temperature of 155° C. and at a pressure of 5 p.s.i.g. and recycled for reintroduction into the paraxylene separator and 53.51 parts of heavier than $C_8$ fractions are removed as bottoms and recycled along with the lighter than $C_8$ fraction for reintroduction into the isomerization reaction.

EXAMPLE II

A liquid feed stock containing 99.2 weight percent $C_8$ aromatics as shown in Table I was charged to an isomerization reactor containing a nickel-tungsten isomerization catalyst at isomerization conditions of 910° F., 300 p.s.i.g., 1.6 LHSV and a hydrogen to hydrocarbon mol ratio of 3.1. As can be seen from Table I, the $C_8$ aromatics recovery was 90.1 weight percent, the p-xylene concentration in the $C_8$ aromatic product liquid fraction was 81.6 percent of the thermodynamic equilibrium. The results indicate that, while the $C_8$ aromatics were substantially isomerized, a portion of the $C_8$ aromatic feed was converted to undesirable by-products. The product liquid analysis indicates that the by-products were non-aromatics, benzene, toluene and heavy aromatics.

EXAMPLE III

A liquid feed stock containing 32.2 weight percent toluene and 67.6 weight percent $C_8$ aromatics as shown in Table I was charged to the reactor and catalyst used in Example II where the operating conditions were 910° F., 300 p.s.i.g., 1.6 LHSV and a hydrogen to hydrocarbon mole ratio of 2.9. From Table I, it can be seen that the $C_8$ aromatic recovery was 95.9 weight percent and the p-xylene concentration in the $C_8$ aromatic product liquid fraction was 84.2 percent of the equilibrium value. This example demonstrates the beneficial effect derived from including toluene during isomerization of the reactor feed.

EXAMPLE IV

A liquid feed stock containing 43.0 weight percent 1,2,4-dimethylbenzene as heavy aromatic recycle and 56.7 weight percent $C_8$ aromatics as shown in Table I was charged to the reactor and catalyst used in Example II where the operating conditions were 910° F., 300 p.s.i.g., 1.7 LHSV and a hydrogen to hydrocarbon mole ratio of 3.1. Table I shows the $C_8$ aromatic recovery to be 102.1 weight percent where a portion of the $C_9$ material was converted to the desired $C_8$ aromatics and the p-xylene concentration in the $C_8$ aromatic product liquid fraction was 71.9 percent of the equilibrium value. By including the $C_9$ aromatic in the feed to the isomerization reaction, a significant increase to the $C_8$ aromatics recovery was produced.

EXAMPLE V

A liquid feed stock containing 22.8 weight percent toluene, 43.0 weight percent $C_8$ aromatics and 34.1 weight percent 1,2,4-trimethylbenzene as shown in Table I was charged to the reactor and catalyst used in Example II where the operating conditions were 908° F., 300 p.s.i.g., 1.6 LHSV and a hydrogen to hydrocarbon mole ratio of 3.3. As can be seen from Table I, the $C_8$ aromatic recovery was 109.2 weight percent where a portion of $C_7$ and $C_9$ materials were thus converted to the desirable $C_8$ aromatics. The p-xylene percent of the equilibrium in the $C_8$ aromatic product liquid was 73.6 percent.

The above Examples II through V illustrate the benefits derived by recycling the reaction by-products. The $C_8$ aromatic recovery was greater in each instance where the feed to the isomerization reactor contained reaction by-products as compared to charging only $C_8$ aromatics. As has been demonstrated, by-product recycle significantly reduces the quantity of $C_8$ aromatic feed necessary to produce a given quantity of p-xylene or other desired $C_8$ isomer.

We claim:

1. A process for the production of a dimethylated $C_8$ aromatic hydrocarbon which comprises the steps of:
   (a) separating a xylene isomer from an aromatic hydrocarbon stream containing orthoxylene, metaxylene, paraxylene and ethylbenzene thereby providing a residuum aromatic hydrocarbon stream and recovering said separated xylene isomer;
   (b) isomerizing said residuum under hydroisomerization conditions thereby producing an isomerizate enriched with said separated xylene isomer;
   (c) separating said isomerizate into a lighter than $C_8$ fraction, a $C_8$ fraction and a heavier than $C_8$ fraction;
   (d) recycling said lighter than $C_8$ fraction and heavier than $C_8$ fraction of step (c) and introducing said fractions along with said residuum of step (a) into step (b); and
   (e) recycling said $C_8$ fraction of step (c) to step (a).

2. A process according to claim 1 wherein said separated xylene isomer in step (a) is paraxylene.

3. A process according to claim 1 wherein said separated xylene isomer in step (a) is metaxylene.

4. A process according to claim 1 wherein said separated xylene isomer in step (a) is orthoxylene.

5. A process according to claim 1 wherein said residuum in step (b) is contacted with an isomerization catalyst under hydroisomerization conditions of from 600 to 1000° F., 50 to 500 p.s.i.g., a liquid hourly space velocity of from 1 to 10 and a hydrogen to hydrocarbon mole ratio of 1:1 to 20:1.

6. A process according to claim 1 wherein said residuum in step (b) is contacted with an isomerization catalyst under hydroisomerization conditions of from 650 to 960° F., 100 to 300 p.s.i.g., a liquid hourly space velocity of from 1 to 4 and a hydrogen to hydrocarbon mole ratio of 3:1 to 15:1.

7. A process according to claim 1 wherein said isomerization of step (b) is separated into a gaseous and a liquid phase, said gaseous phase comprising hydrogen and $C_1$ to $C_6$ paraffinic hydrocarbons, and where said gaseous phase is recycled to step (b).

8. A process according to claim 7 wherein said gaseous phase comprise at least 85 volume percent hydrogen.

9. A process according to claim 1 wherein said lighter than $C_8$ fraction of step (d) comprises benzene and toluene.

10. A process according to claim 1 wherein said isomerizate of step (c) is additionally separated into a $C_1$ to $C_6$ paraffinic fraction.

TABLE I

| Example | II Feed | II Product | III Feed | III Product | IV Feed | IV Product | V Feed | V Product |
|---|---|---|---|---|---|---|---|---|
| Liquid composition, wt. percent: | | | | | | | | |
| Non-Aromatics | 0.1 | 2.9 | 0.0 | 2.7 | 0.0 | 2.1 | 0.0 | 2.8 |
| Benzene | 0.3 | 1.0 | 0.2 | 1.0 | 0.1 | 0.5 | 0.1 | 0.6 |
| Toluene | 0.4 | 3.3 | 32.2 | 29.0 | 0.2 | 1.5 | 22.8 | 19.7 |
| Ethylbenzene | 9.8 | 8.8 | 6.9 | 6.5 | 5.9 | 4.7 | 4.4 | 4.4 |
| p-Xylene | 9.4 | 15.4 | 6.4 | 11.6 | 5.2 | 9.0 | 3.7 | 7.3 |
| m-Xylene | 54.4 | 43.7 | 37.9 | 32.6 | 32.2 | 27.5 | 24.5 | 23.5 |
| o-Xylene | 25.6 | 22.2 | 16.4 | 15.1 | 13.4 | 18.6 | 10.4 | 12.2 |
| Heavy aromatics ($C_9$+) | 0.0 | 2.7 | 0.0 | 1.5 | 43.0 | 36.1 | 34.1 | 29.5 |
| Total | 100.0 | 100.0 | 100.0 | 100.0 | 100.0 | 100.0 | 100.0 | 100.0 |
| Percent $C_8$ in liquid | 99.2 | 90.1 | 67.6 | 65.8 | 56.7 | 59.8 | 43.0 | 47.4 |
| $C_8$ aromatic recovery, wt. percent basis $C_8$ infeed | | 90.1 | | 95.9 | | 102.1 | | 109.2 |
| Percent p-xylene in $C_8$ fraction | 9.5 | 17.1 | 9.5 | 17.6 | 9.2 | 15.1 | 8.6 | 15.4 |
| Percent p-xylene equilibrium in $C_8$ fraction | | 81.6 | | 84.2 | | 71.9 | | 73.6 |
| Total liquid recovery, wt. percent | | 99.2 | | 98.5 | | 96.8 | | 99.0 |

References Cited

UNITED STATES PATENTS 2,837,581  6/1958  Hill et al. _____ 260—668
3,211,798  10/1965  Burk et al. _____ 260—668

DELBERT E. GANTZ, Primary Examiner

C. R. DAVIS, Assistant Examiner

U.S. Cl. X.R.

260—672, 674